United States Patent [19]

Campioni

[11] 4,134,127

[45] Jan. 9, 1979

[54] COLOR TELEVISION SIGNAL INCLUDING AUXILIARY INFORMATION

[75] Inventor: Armando Campioni, Turin, Italy

[73] Assignee: Indesit Industria Elettrodomestici Italiana S.p.A., Rivalta, Italy

[21] Appl. No.: 719,783

[22] Filed: Sep. 2, 1976

Related U.S. Application Data

[63] Continuation-in-part of Ser. No. 695,694, Jun. 14, 1976, abandoned.

[30] Foreign Application Priority Data

Jun. 12, 1975 [IT] Italy .................... 68510 A/75

[51] Int. Cl.² ................ H04N 9/46; H04N 9/38; H04N 7/04
[52] U.S. Cl. ................................ 358/16; 358/19; 358/147
[58] Field of Search ............... 358/144, 145, 147, 12, 358/14, 16, 19, 20

[56] References Cited

U.S. PATENT DOCUMENTS

| | | | |
|---|---|---|---|
| 3,162,838 | 12/1964 | Sauvanet | 358/14 |
| 3,466,387 | 9/1969 | Rout | 358/145 |
| 3,493,674 | 2/1970 | Houghton | 358/147 |
| 3,716,656 | 2/1973 | Lambert et al. | 358/14 |

OTHER PUBLICATIONS

Maegele, "Digital Transmission of Two Television Sound Channels in Horizontal Blanking", *Journal of SMPTE*, vol. 84, Feb. 1975. pp. 68-70.
Gassman, "Twelve Sound Channels During the Vertical Sync Interval of the Television Signal", *IEEE Trans. Broadcast and TV Receivers*, USA vol. BTR-16, No. 4, Nov. 1970, pp. 318-324.
Fink, *Television Engineering Handbook*, McGraw-Hill, 1957, pp. 2-26.

*Primary Examiner*—John C. Martin
*Attorney, Agent, or Firm*—Sughrue, Rothwell, Mion, Zinn and Macpeak

[57] ABSTRACT

A color television system, such as the NTSC system, in which at least a part of the chromatic information is transmitted as suppressed carrier amplitude modulation of a subcarrier, and a subcarrier burst is inserted in the signal as a reference signal for use in demodulating the signal in which the subcarrier bursts are suppressed from some of the lines of the T.V. signal and replaced by signals carrying additional sound or picture information such as emergency messages, newsflashes or the like.

17 Claims, 6 Drawing Figures

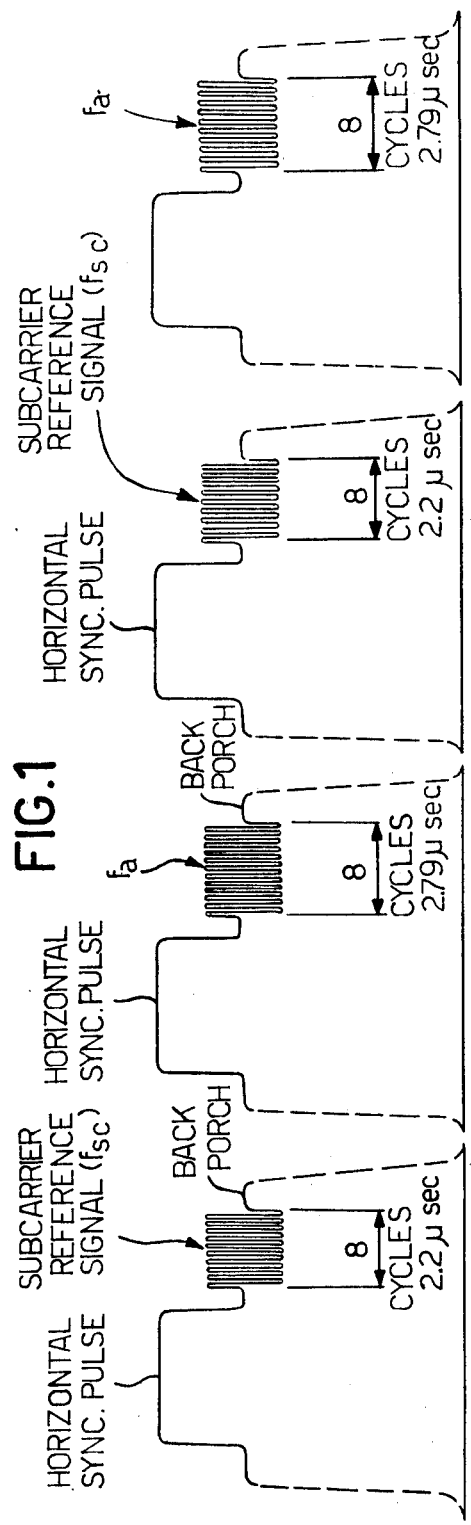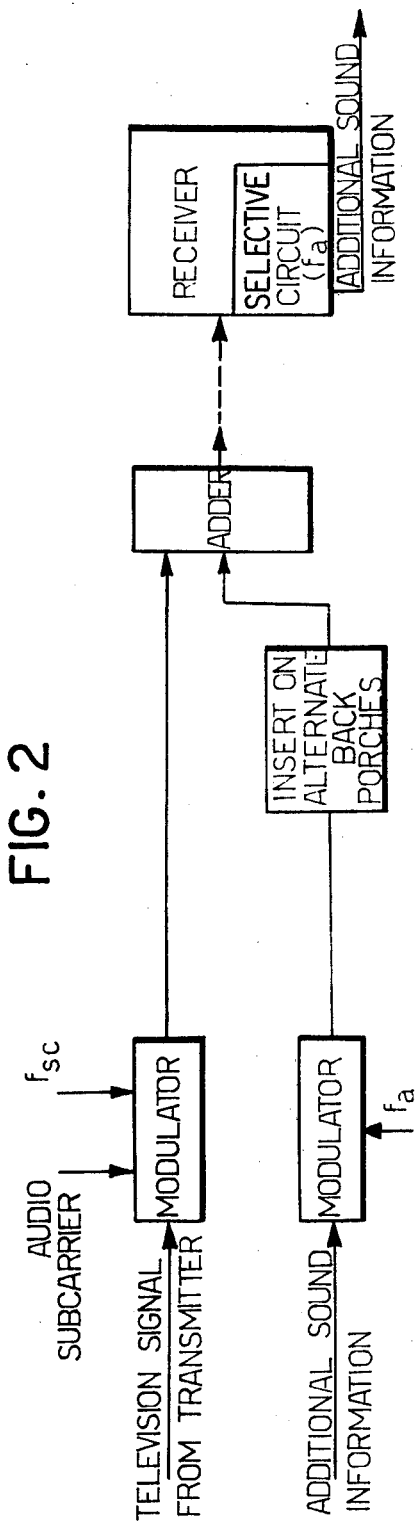

COLOR TELEVISION SIGNAL INCLUDING AUXILIARY INFORMATION

This application is a continuation-in-part application of Ser. No. 695,694, filed June 14, 1976, now abandoned.

BACKGROUND OF THE INVENTION

The present invention relates to a color television system in which at least one part of the chromatic information is transmitted by suppressed carrier amplitude modulation of a subcarrier and it is therefore necessary to have a periodic reference signal, formed by a subcarrier burst.

Normally such reference signal is inserted every line, on the cancellation pedestal (back porch) which follows the synchronizing signal; this refers for example to the NTSC system which is used, inter alia, in the United States of America and in Japan. The norms for the NTSC system are given for example in "Federal Communications Commission, Public Notices" of Dec. 17, 1953 and June 6, 1954.

OBJECT OF THE INVENTION

The object of the present invention is to enable a color television system of the above defined type to be used for the transmission of additional information while still transmitting the main information without interruption.

SUMMARY OF THE INVENTION

According to the present invention, there is provided, in a color television system of the type in which at least one part of the chromatic information is transmitted as suppressed carrier amplitude modulation of a subcarrier and a subcarrier burst is inserted in the color television signal as a reference for subsequent demodulation of said color television signal, the improvement wherein said subcarrier burst is not inserted in all the lines of said color television signal, one or more items of supplementary information being inserted in those positions of said color television signal where said subcarrier burst would have been inserted.

BRIEF DESCRIPTION OF THE DRAWINGS

Two embodiments of the invention are illustrated, by way of example, in the accompanying drawings, in which:

FIG. 1 is a waveform illustrating the invention;

FIG. 2 is a block diagram illustrating the described invention;

FIG. 1 illustrates the invention disclosed above in words; that is, instead of using the prior art technique of inserting the subcarrier burst reference signal $f_{sc}$ on the back porch of each horizontal sync pulse, the burst signal $f_{sc}$ is replaced on every other back porch by the additional burst of frequency $f_a$. It is this additional burst which is modulated by the additional or supplementary sound information.

FIG. 2 is a block diagram also illustrating the invention. The block diagram illustrates a conventional NTSC system including a transmitter and receiver. The only difference from the conventional system on the transmitter side is that the additional burst signal $f_a$ is modulated by the additional sound information which then is inserted on alternate back porches of the horizontal sync pulses as illustrated in FIG. 1. The only difference in the conventional receiver is that it includes a selective circuit tuned to the frequency $f_a$ for recovering the additional sound information.

For convenience, the invention is particularly described in relation to an NTSC system, but the NTSC is taken purely by way of example and the invention is applicable to other systems. For clarity, merely the encoder and decoder circuits are illustrated in block diagram form, the remaining parts of the transmitters and receivers being conventional and well known.

DESCRIPTION OF A FIRST EMBODIMENT OF THE INVENTION

Supplementary sound information is transmitted and received in the first embodiment of the invention. In the NTSC system a subcarrier burst of 8 cycles at the frequency of the color subcarrier, for a duration of about 2.2 μS, is inserted every line on the pedestal (back porch) following the line synchronizing pulse. This burst is inserted, in accordance with the invention, only every second line.

At the position which would be occupied by the subcarrier burst which is suppressed, there is inserted a burst of different frequency, preferably a multiple of the line frequency, which is sufficiently different from that of the subcarrier, and of duration equal to a multiple of the inverse of the difference between the frequency of the color subcarrier and the frequency of the burst which carries the supplementary information.

This can be expressed mathematically as follows:

$$f_a = nf_h$$

$$f_{sc} - f_a = m/d$$

Where:

$f_{sc}$ = the frequency of the color subcarrier;
$f_a$ = the frequency of the additional burst;
d = the duration of the additional burst;
$f_h$ = the line frequency.

In this way there is a minimum of interference between the color information and the additional information.

This can be readily understood from the following numerical example:

$$f_h = 15734.264 \text{ Hz}$$

$$f_{sc} = 3.579545 \text{ MHz}$$

$$f_a = 182 f_h = 2.863636 \text{ MHz}$$

$$d = m/(f_{sc} - f_a) = 2/715909 = 2.79 \text{ μS}$$

which latter is equal to 8 cycles at a frequency of $f_a$.

The number of cycles in fact is given by:

$$K = \frac{mn}{\frac{f_{sc}}{f_n} - \eta} = \frac{182.2}{227.5 - 182} = 8$$

This additional burst of frequency $f_a$ may then for example be frequency modulated (or amplitude modulated) with the additional sound information.

Figure 3:
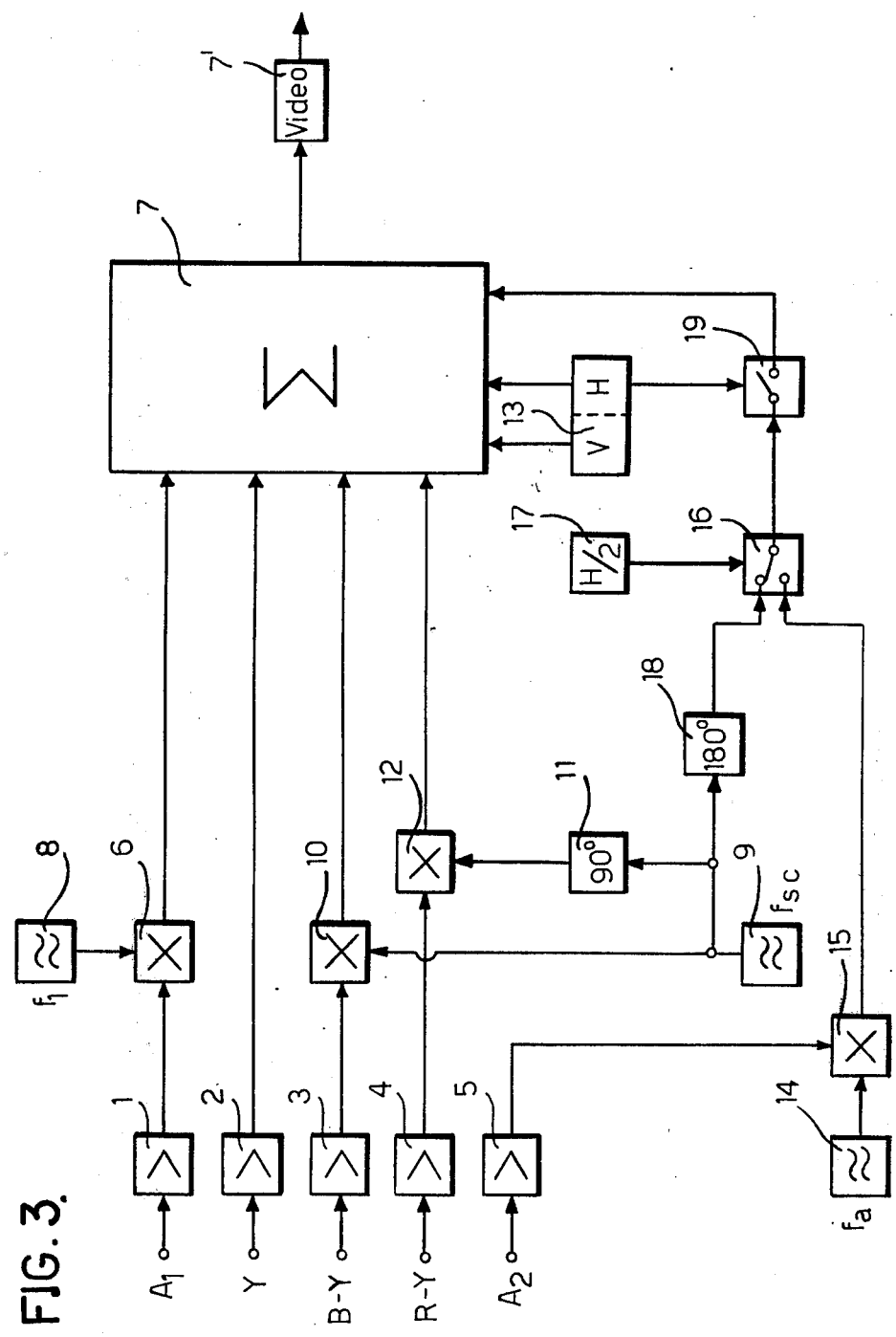
FIG. 3 is a block diagram of an encoder circuit forming part of a color television transmitter in accordance with a first embodiment of the invention.

Referring specifically to the drawings, FIG. 3 shows a circuit for encoding all the audio and video information which one wants to transmit, in a single video signal. $A_1$ indicates the main sound information and the means for producing the same, $A_2$ indicates the supplementary sound information and the means for producing the same, Y indicates the luminance signal and the means for producing the same, B−Y and R−Y indicate the two color difference (chrominance) signals and the means for producing the same. Said producing means are conventional and well known. Amplifiers 1, 2, 3, 4, 5 amplify the respective signals to a suitable level for the successive stages. A frequency modulator 6 modulates with the main sound information signal $A_1$ a carrier $f_1$ of 4.5 MHz generated in an oscillator 8, and supplies the modulated signal to an adding circuit 7. The luminance signal Y is passed direct to the adding circuit 7 from the amplifier 2. The color difference signals B−Y and R−Y amplitude modulate a subcarrier $f_{sc}$ provided by an oscillator 9, in respective modulators 10 and 12, the subcarrier undergoing a phase shift of 90° for the color difference signal R−Y in a phase shifter 11. The modulators 10 and 12 pass the modulated signals to the adding circuit 7. The adding circuit 7 also receives in a conventional and well known manner the horizontal and vertical synchronizing signals supplied by a synchronization generator 13.

The supplementary sound information signal $A_2$ coming from the amplifier 5 frequency modulates an additional carrier $f_a$ provided by an oscillator 14, in a modulator 15. The output of the modulator 15 is connected to a change-over switch or gate 16 which is controlled by a control signal at half the line frequency supplied by a generator 17 in such a way as to connect its output alternately to its two inputs. The color carrier $f_{sc}$ is supplied to the other input, coming from the oscillator 9 and being phase shifted through 180° by a phase shifter 18. The color carrier and the supplementary sound information signal pass through a gate 19 suitably controlled by the horizontal synchronization generator 13 (H) in such a way that the color carrier and the supplementary sound information signal are only passed to the adding circuit 7 during the time corresponding to the back porch.

In this manner, the adding circuit 7 receives during one line the burst or reference signal for the chrominance information and during the next line the supplementary sound information signal, which however is sampled or supplied at half the line frequency. For this reason, it is necessary to eliminate the sampling effect in the receiver before supplying the supplementary sound information to sound reproducing means.

The output of the adding circuit 7 is connected to normal transmission means 7', such means being conventional and well known.

Figure 4:
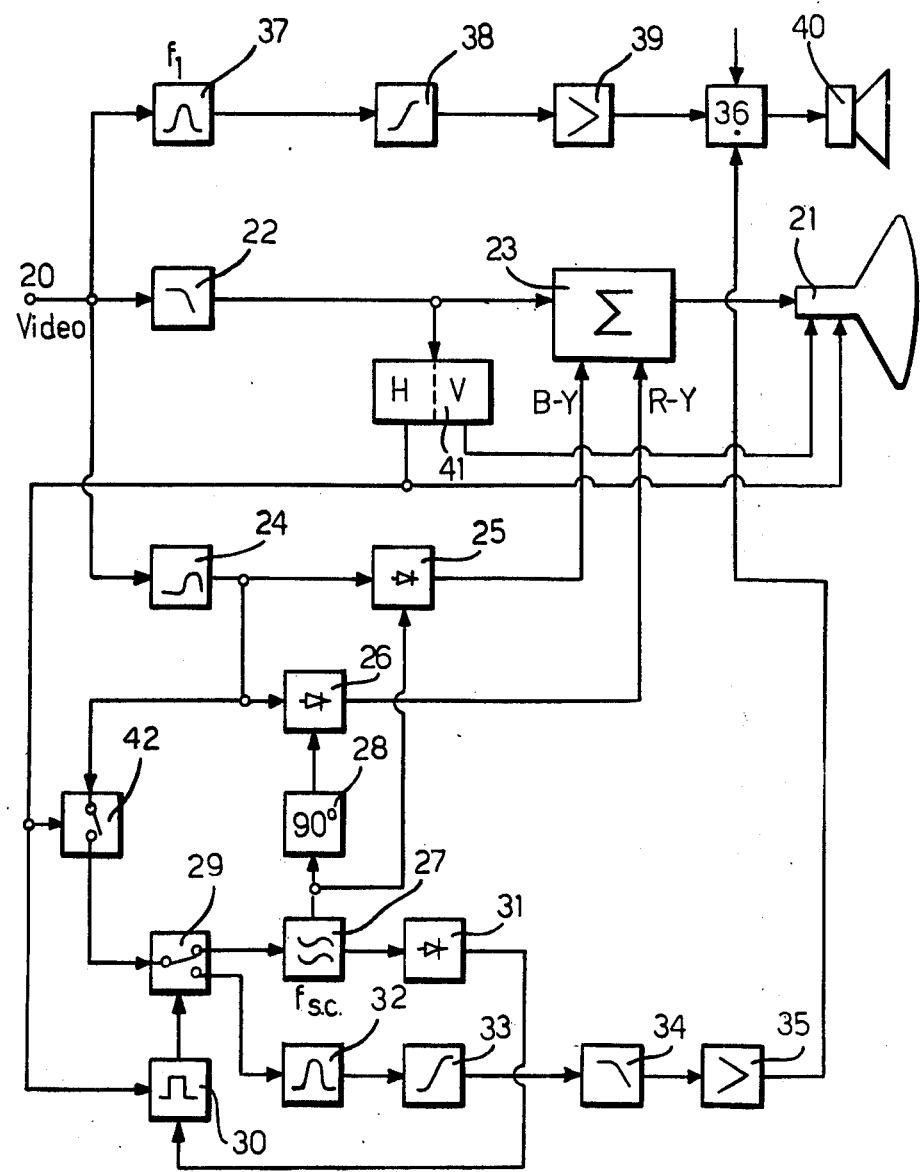
FIG. 4 is a block diagram of a decoder circuit forming part of a color television receiver in accordance with the first embodiment of the invention.

The receiver, shown in FIG. 4, has conventional and well known receiving means 20, which supplies a video signal at its output.

The luminance signal Y is separated from the remainder of the video signal by means of a low pass filter 22 which is connected to an adding circuit 23 and thence to color reproducing means in the form of a television tube 21. The color difference signals B−Y and R−Y reach the adding circuit 23 by way of a pass band filter 24 and two synchronous detectors 25 and 26. The synchronous detectors receive the subcarrier $f_{sc}$ which is regenerated by subcarrier regenerating means in the form of a quartz filter circuit 27, the quartz filter circuit supplying the subcarrier directly to the synchronous detector 25 and, by way of a phase shifter 28 to shift the phase of the subcarrier through 90°, to the synchronous detector 26. The subcarrier $f_{sc}$ is regenerated in the quartz filter circuit 27 by means of the burst at the frequency $f_{sc}$ which reaches the quartz filter circuit 27 every alternate line by way of a gate circuit 42 which only opens during the line return and by way of the change-over switch or gate 29. The switch or gate 29 is controlled by a flip-flop 30 which is in turn controlled by the line return signal H received from a deflection circuit 41 (H) and identified by a reset signal which comes from an amplitude detector 31. This reset signal is supplied only when the phase of the flip-flop 30 is incorrect; in this case, the switch or gate 29 supplies the filter 27 with a burst at a frequency $f_a$ (the additional carrier frequency) which however cannot pass through the filter 27 so that the detector 31, not receiving a signal, produces a reset signal for the flip-flop 30.

However, when the phase of the flip-flop 30 is correct, the burst at the frequency $f_{sc}$ reaches the filter 27 during one line, and during the other line the switch or gate 29 supplies to a pass band filter 32, bursts at frequency $f_a$; the pass band filter 32 has a preferential (pass) frequency of $f_a$ and removes unwanted frequencies, principally the frequency $f_{sc}$, thereby acting as a trap circuit, passing its output to a detector 33. The detector 33 is a frequency demodulator which demodulates the supplementary sound information $A_2$ and supplies it to a low pass filter 34 which eliminates the sampling effect which is produced in the transmitter and removes unwanted frequencies such as field frequencies.

The supplementary sound information $A_2$ passes through an amplifier 35 and is supplied to sound reproducing means indicated as 36 and 40. The main sound information $A_1$ also reaches the sound reproducing means 36 and 40, having been detected in a conventional and well known manner. From the receiving means 20, the main sound information signal passes through a pass band filter 37, a frequency demodulator 38 and an amplifier 39.

The sound reproducing means 36 and 40 can be of any suitable type, for instance having one loudspeaker with a change-over switch or, particularly for stereophonic reception, two loudspeakers. If there is a single loudspeaker with a change-over switch, the change-over switch can be a manual switch (if the supplementary sound channel is, for example, being used for an alternative language) or may be an automatic switch actuated by a supplementary information circuit of the color killer type.

The horizontal and vertical synchronization signals are provided in a conventional and well known manner in a deflection circuit 41 and are supplied to the television tube 21.

For a further description of parts of the circuit referred to above, reference may be made to Italian patent application No. 68055-A/74 filed Apr. 3, 1974.

It should be noted that it would be possible to regenerate the subcarrier in the quartz filter circuit 27 without the incorporation of the switch or gate 29 to select the reference signal only every second line of the television signal, i.e. without any change in the conventional receiver, since the subcarrier regenerator 27 works equally well when only receiving half energy. However, in such an arrangement, a deterioration is experienced in the signal-to-noise ratio, though the deterioration amounts to 6 dB, which is almost never significant. By incorporating the switch or gate 29, the deterioration in the signal-to-noise ratio is reduced to only 3dB, which gives substantially the same quality of operation as that of existing PAL receivers (it is known that in PAL systems there is a deterioration of 3dB in the signal-to-noise ratio by the subcarrier regeneration, given that the reference signal does not have a constant phase; theoretically this deterioration can be overcome, in PAL systems, by drawing the reference signal downstream from the delay line, but this is something which no manufacturer does in practice).

It should also be noted that the receiver circuit shown in FIG. 4 is not much more complicated than the conventional and well known circuit.

The types of supplementary information which may be transmitted could be news items (whether bulletins, road conditions, etc.), testing signals, or the exact time. The additional channel may also be used for emergency messages, and the receiver may be prearranged to switch itself automatically onto the additional channel whenever the additional burst is inserted.

Other modulation systems, such as PCM (pulse code modulation) may be used, as indicated more particularly below.

DESCRIPTION OF A SECOND EMBODIMENT OF THE INVENTION

The transmitter and receiver of the second embodiment are for the transmission and reception of supplementary information in picture form at low picture frequency. In addition to the items of information mentioned above, the picture form information may be formed of reproductions such as facsimiles or television transmitted newsreels.

The second embodiment is very similar to the first embodiment, and similar or identical components are referenced with the same reference numeral.

Figure 5:
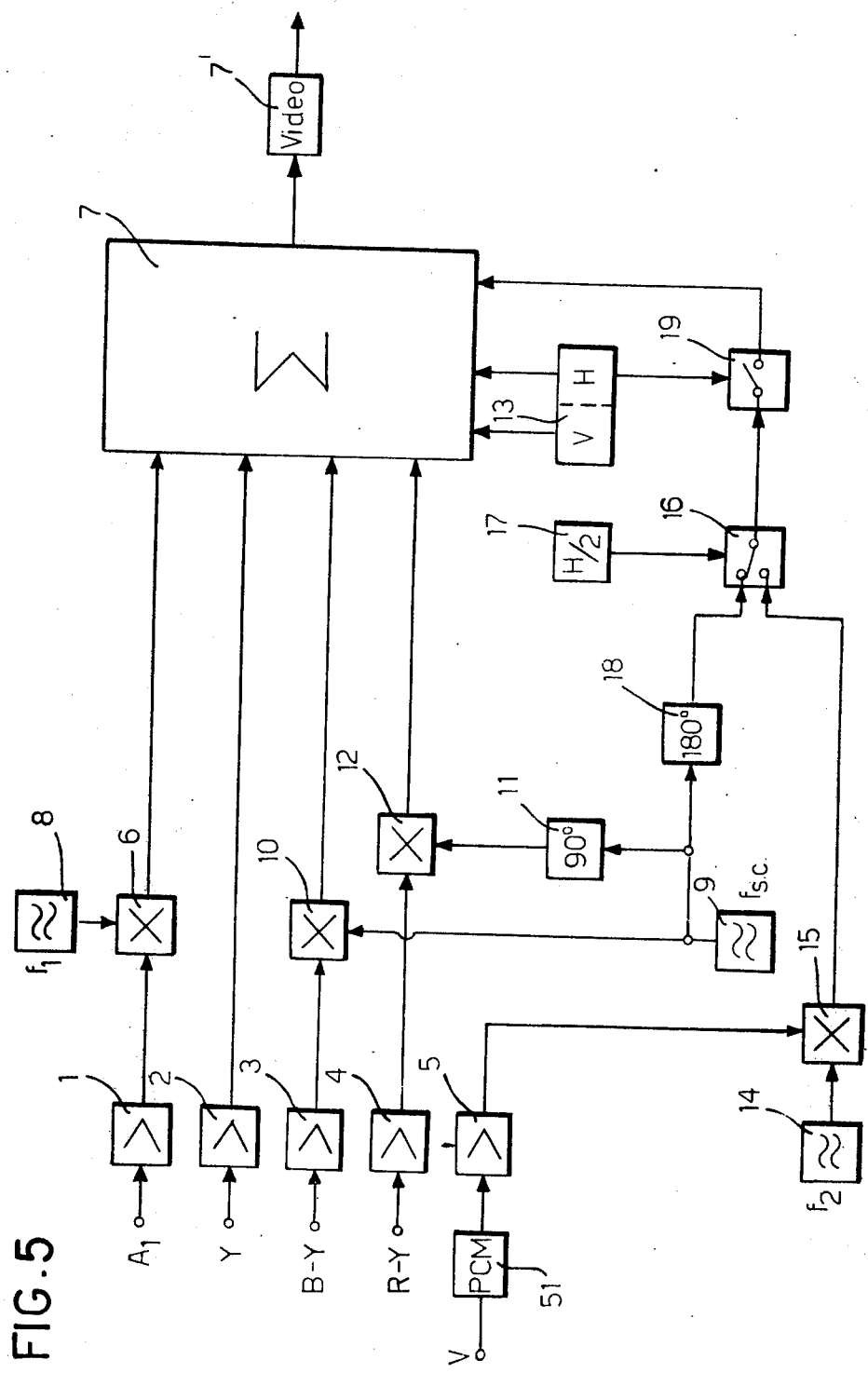
FIG. 5 is a block diagram of an encoder circuit forming part of a color television transmitter in accordance with a second embodiment of the invention.

In the transmitter (shown in FIG. 5), the amplifier 5 is preceded by a PCM encoder 51 for encoding a visual signal coming from means V for producing the same, which means are conventional and well known.

Figure 6:
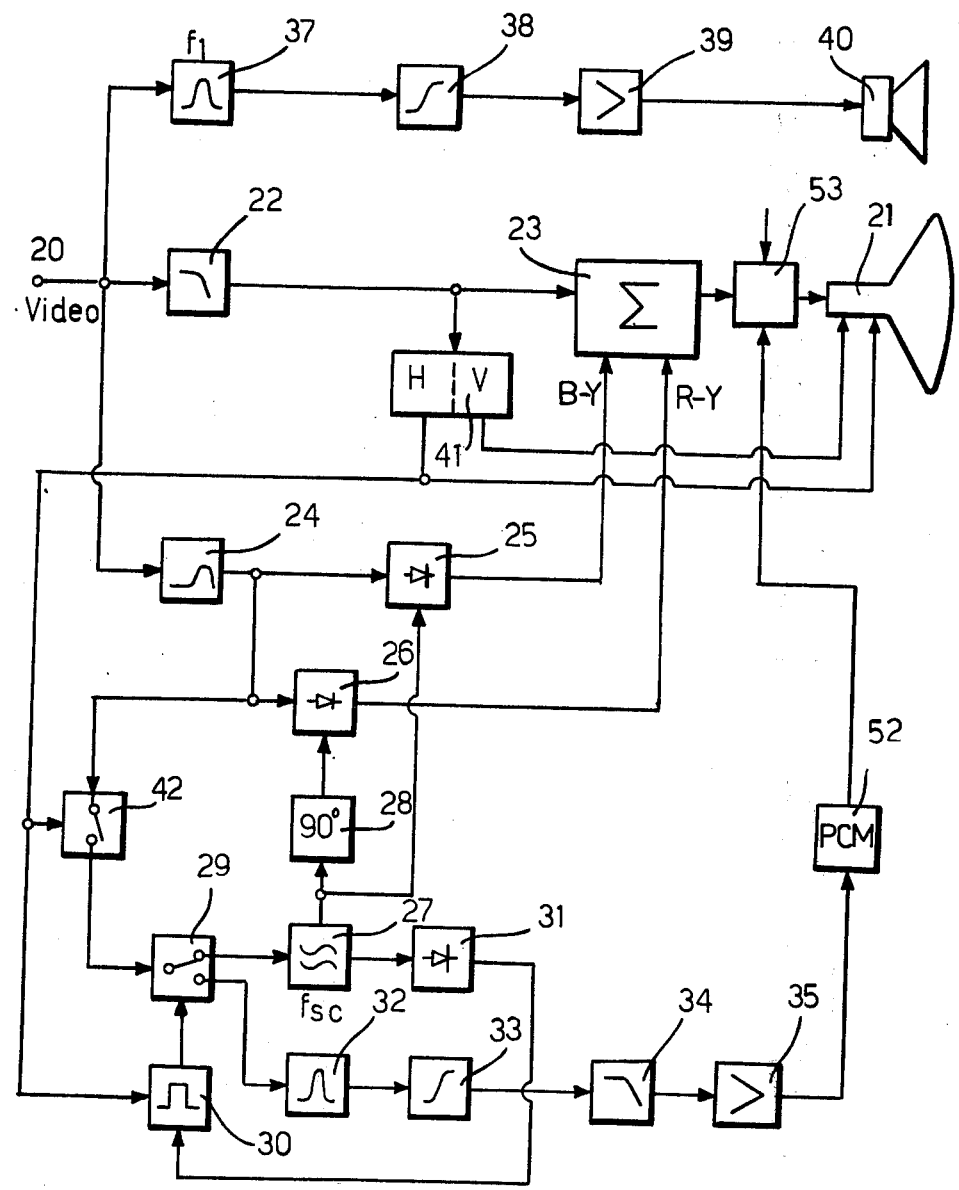
FIG. 6 is a block diagram of a decoder circuit forming part of a color television receiver in accordance with the second embodiment of the invention.

In the receiver (shown in FIG. 6), a PCM decoder 52 is connected to the output of the amplifier 35, and the output of the PCM decoder 52 is connected to a manual or automatic switch 53 inserted between the adding circuit 23 and the television tube 21. The output of the amplifier 29 is connected directly to a loudspeaker 40.

Now that this invention has been particularly described, many modifications would be conceivable by those skilled in the art, such modifications nevertheless falling within the spirit and scope of the present invention.

I claim:

1. A method of communicating a color television signal comprising image information including chromatic information as suppressed carrier modulation of a subcarrier, and in addition line synchronizing signals recurring at regular intervals so as to divide said color television signal into a sequence of lines, and field synchronizing signals recurring at regular intervals so as to divide said color television signal into a sequence of fields, every field containing a determined number of lines the majority of which, but not all of which, contain said image information, and wherein, at a position during the line blanking interval, immediately following the line synchronizing pulse of some but not all of the lines which contain said image information, is inserted a subcarrier burst as a reference for subsequent demodulation of the color television signal, and wherein at least one item of supplementary information is inserted at said position during the line blanking interval of only the lines which do not contain said subcarrier burst.

2. The method of claim 1, comprising receiving and decoding the color television signal, said receiving and decoding including the step of opening a gate during said line blanking interval of the lines which do not contain said subcarrier burst, to prevent the passage to subcarrier regenerating means of said item of supplementary information.

3. A method of transmitting a color television signal comprising image information including chromatic information as suppressed carrier modulation of a subcarrier, and in addition line synchronizing signals recurring at regular intervals so as to divide said color television signal into a sequence of lines, and field synchronizing signals recurring at regular intervals so as to divide said color television signal into a sequence of fields, every field containing a determined number of lines the majority of which, but not all of which, contain image information, and wherein, at a position during the line blanking interval, immediately following the line synchronizing pulse of substantially every second line which contains said image information, is inserted a subcarrier burst as a reference for subsequent demodulation of the color television signal, and wherein at least one item of supplementary information is inserted at said position during the line blanking interval of only the lines which do not contain said subcarrier burst.

4. A method of transmitting a color television signal comprising image information including chromatic information as suppressed carrier modulation of a subcarrier, and in addition line synchronizing signals recurring at regular intervals so as to divide said color television signal into a sequence of lines, and field synchronizing signals recurring at regular intervals so as to divide said color television signal into a sequence of fields, every field containing a determined number of lines the majority of which, but not all of which, contain said image information, and wherein, during the line blanking interval, immediately following the line synchronizing pulse of some but not all of the lines which contain said image information, is inserted a subcarrier burst as a reference for subsequent demodulation of the color television signal, and wherein at least one item of supplementary information is inserted during the line blanking interval of the lines which do not contain said subcarrier burst, as an additional burst at a frequency which is different from that of said subcarrier burst and which is a whole multiple of the line frequency.

5. A method of transmitting a color television signal comprising image information including chromatic information as suppressed carrier modulation of a subcarrier, and in addition line synchronizing signals recurring at regular intervals so as to divide said color television signal into a sequence of lines, and field synchronizing signals recurring at regular intervals so as to divide said color television signal into a sequence of fields, every field containing a determined number of lines the majority of which, but not all of which, contain said image information, and wherein, during the line blanking interval, immediately following the line synchronizing pulse of some but not all of the lines which contain said image information is inserted a subcarrier burst as a reference for subsequent demodulation of the color television signal, and wherein at least one item of supplementary information is inserted during the line blanking interval of the lines which do not contain said subcarrier burst, as an additional burst at a frequency which is different from that of said subcarrier burst and which is a whole multiple of the line frequency, the duration of said additional burst being substantially equal to a multiple of the inverse of the difference between the frequency of the color subcarrier and the frequency of said additional burst.

6. A method of transmitting, receiving and decoding a color television signal, wherein the color television signal transmitted comprises image information including chromatic information as suppressed carrier modulation of a subcarrier, and in addition line synchronizing signals recurring at regular intervals so as to divide said color television signal into a sequence of lines, and field synchronizing signals recurring at regular intervals so as to divide said color television signal into a sequence of fields, every field containing a determined number of lines the majority of which, but not all of which, contain said image information, and which color television signal, during the line blanking interval, immediately following the line synchronizing pulse of some but not all of the lines which contain said image information is inserted a subcarrier burst as a reference for subsequent demodulation of the color television signal, and in which color television signal at least one item of supplementary information is inserted as an additional burst of different frequency from that of said subcarrier burst during the line blanking interval of the lines which do not contain said subcarrier burst, said receiving and decoding including the step of providing a selective circuit tuned to the frequency of said additional burst.

7. A color television receiver for receiving a color television signal comprising image information including chromatic information as suppressed carrier modulation of a subcarrier, and in addition line synchronizing signals recurring at regular intervals so as to divide said color television signal into a sequence of lines, and field synchronizing signals recurring at regular intervals so as to divide said color television signal into a sequence of fields, every field containing a determined number of lines the majority of which, but not all of which, contain said image information, a subcarrier burst being inserted during the line blanking interval as a reference for subsequent demodulation of the color television signal, the receiver comprising:
   color reproducing means for reproducing a color television signal;
   sound reproducing means for reproducing a sound signal;
   line and field synchronizing means for synchronizing the line and field deflection; and
   detecting means for detecting the color television signal and supplying respective signals to the color and sound reproducing means and to line and field reproducing means, which detecting means includes subcarrier regenerating means, gate means for passing a signal to the subcarrier regenerating means, controlling means controlling the gate means to pass said lines which contain the subcarrier burst and means for detecting at least one item of supplementary information inserted during the line blanking interval of only the lines which do not contain said subcarrier burst and at a position corresponding to that of the subcarrier color reference burst, whereby the receiver can receive a color television signal in which said subcarrier burst is present during the line blanking interval, immediately following the line synchronizing pulse, of some, but not all of the lines which contain said image information and in which at least said item of supplementary information is present during the line blanking interval of only the lines which do not contain said subcarrier burst.

8. A color television transmitter for transmitting a color television signal comprising image information including chromatic information as suppressed carrier modulation of a subcarrier, and in addition line synchronizing signals recurring at regular intervals so as to divide said color television signal into a sequence of lines, and field synchronizing signals recurring at regular intervals so as to divide said color television signal into a sequence of fields, every field containing a determined number of lines the majority of which, but not all of which, contain said image information, the transmitter comprising:
   means for transmitting chromatic information as suppressed carrier modulation of a subcarrier;
   means for inserting a subcarrier burst as a reference for subsequent demodulation of the color television signal at a position during the line blanking interval, immediately following the line synchronizing pulse, of some, but not all of, the lines which contain said image information; and
   means for inserting at least one item of supplementary information at said position during the line blanking interval of only the lines which do not contain said subcarrier burst.

9. A method of communicating a color television signal comprising chromatic information, comprising transmitting at least a part of the chromatic information as suppressed carrier modulation of a subcarrier, inserting a subcarrier burst into only every second line of the color television signal as a reference for subsequent demodulation of the color television signal, and inserting at least one item of supplementary information in the remaining lines of the color television signal as an additional burst at a frequency different from that of said subcarrier burst and at a position corresponding to that of the subcarrier color reference burst.

10. The method of claim 9, wherein the frequency of said additional burst is a whole multiple of the line frequency.

11. The method of claim 10, wherein the duration of said additional burst is substantially equal to a multiple of the inverse of the difference between the frequency of the color subcarrier and the frequency of said additional burst.

12. The method of claim 9, wherein said item of supplementary information is an item of sound information.

13. The method of claim 9, wherein said item of supplementary information is an item of picture information.

14. The method of claim 9, wherein said item of supplementary information is an emergency message.

15. The method of claim 9, and comprising receiving and decoding the color television signal, said receiving and decoding including the step of providing a selective circuit tuned to the frequency of the additional burst.

16. A color television receiver for receiving a color television signal in which at least a part of the chromatic information is transmitted as suppressed carrier modulation of a subcarrier with a subcarrier burst inserted into only every second line of the color television signal as a reference for subsequent demodulation of the color television signal, and in which at least one item of supplementary information is inserted in the remaining lines of the television signal as an additional burst at a frequency different from that of the subcarrier and at a position corresponding to that of the subcarrier color reference burst, the receiver comprising:

color reproducing means for reproducing a color signal;

sound reproducing means for reproducing a sound signal; and detecting means for detecting the color television signal and supplying respective signals to the color and sound reproducing means, which detecting means includes subcarrier regenerating means, gate means for passing a signal to the subcarrier regenerating means, and controlling means controlling the gate means to pass a signal to the subcarrier regenerating means for said every second line in the color television signal, and circuit means for detecting information in said remaining lines of the color television signal, whereby the receiver can receive a color television signal in which said subcarrier burst is inserted in only every second line of the color television signal and in which at least one item of supplementary information is inserted in the remaining lines of the color television signal; said circuit means comprising a selective circuit tuned to the frequency of said additional burst, whereby the receiver can receive and decode said additional burst as an item of supplementary information.

17. The receiver of claim 16, wherein said gate means comprises change-over switch means connected upstream of the subcarrier regenerating means and of the selective circuit.

* * * * *